AUTOMATIC APPARATUS FOR IRRIGATION, WITH TIMER

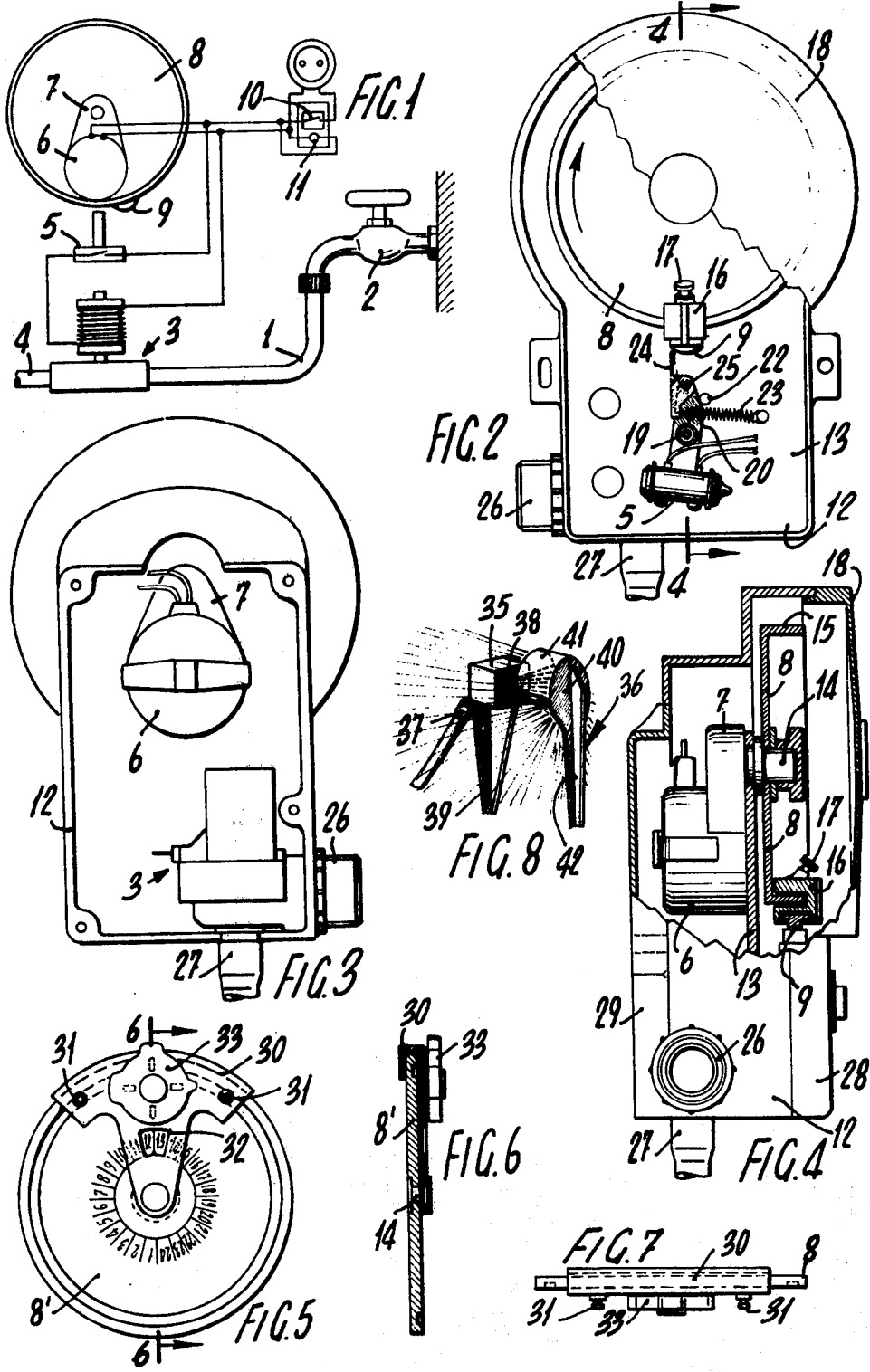

The object of the present invention is an apparatus for watering pot-plants, flowerbeds or gardens, at pre-established intervals, and for pre-established periods of time. The object of the present application is also an apparatus suitable for spreading and nebulizing the irrigating water jet.

It is often a problem, for those who have care of gardens, or even only of plants in pots, to be able to leave home for several days, if they cannot find someone who will substitute them in said care, since the plants need to be watered daily, often more than once. The need for a means which can arrange in advance said operations of irrigation with the desired time-table and period is very much felt.

The apparatus according to the present invention achieves the above-mentioned aims by means of a timer disc which is continuously moved by a small electric motor and which has housings for cams, on which can be placed cams of different dimensions, suitable for controlling, by means of a lever device, the closing of an electric circuit which controls the flow of irrigating water.

To collaborate with this device there has been realized, according to the present application, a diffusing device, to be placed in the ground to be watered, and which consists of a spraying nozzle and a plate opposite to it.

Some realizations of the present invention will be described in the following with reference to the enclosed drawings in which:

FIG. 3 is a back view of the apparatus of FIG. 2 with the cover removed;

FIG. 4 is partially a lateral view and partially a section according to 4—4 of FIG. 2;

FIG. 5 is a front view of another type of timer disc applicable to the apparatus of FIGS. 2, 3 and 4;

FIG. 6 is a section according to 6—6 of FIG. 5;

FIG. 7 is a view from the top of FIG. 5;

FIG. 8 shows a type of realization of the diffuser device.

Figure 1:
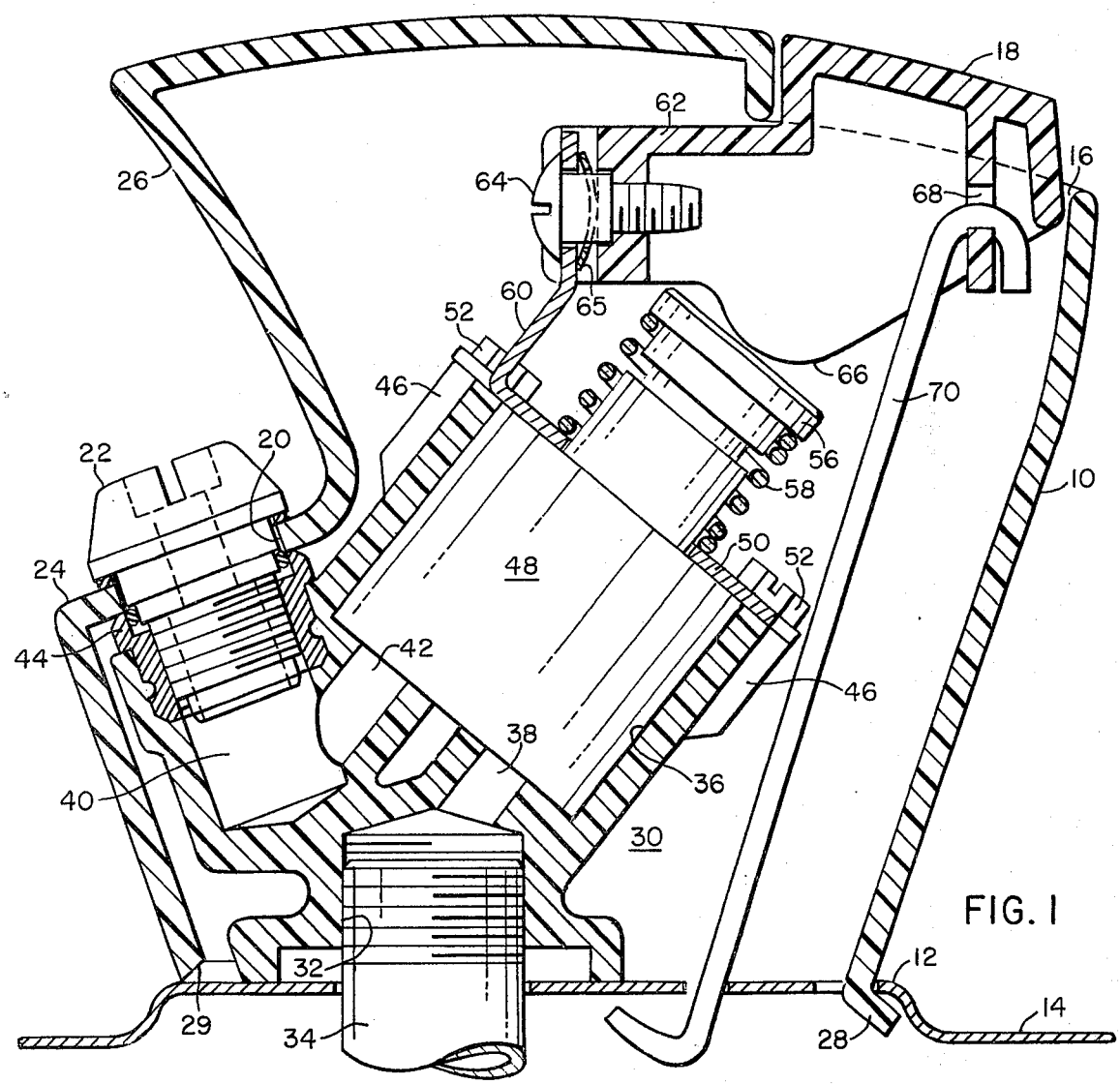
FIG. 1 is a scheme of electric and hydraulic connections for the apparatus object of the application.

Considering the scheme of FIG. 1, there can be noted that on a hydraulic conduit 1, joined upstream to a normal tap 2, an electric valve 3 is placed, which according to the position assumed by a mercury contact or the like, allows the flow or the blocking of the water from the conduit 1 to a second conduit 4, downstream of the electro-valve 3, which carries the water to the plants or an irrigating device. The electro-valve 3 is connected to an electric control circuit through a secondary switch 5, which may be of the mercury bulb type as in the figures, or of any other suitable type (spring switch, press switch, etc.). To the same circuit, but downstream of the secondary switch, an electric motor 6 is connected, which, through a reduction unit 7, rotatingly works a timer disc 8, which bears one or more cams 9 for the working of the secondary switch 5.

The electric circuit, downstream, is closed by a main switch 10, eventually with a warning light 11, and can be normally connected, for example, by means of a plug, to the domestic electricity supply.

Figure 2:
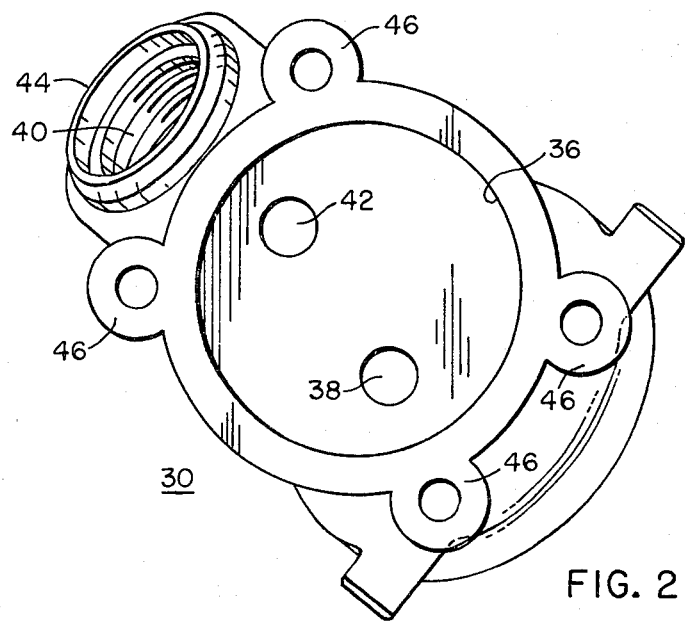
FIG. 2 is a front view of apparatus for the time control of the water flow, with the front cover partially removed to show the interior.

In FIGS. 2, 3 and 4 can be seen one way of realizing an apparatus corresponding to the scheme of FIG. 1. A box body 12 having a median wall 13 bears, on one side of this wall, a generally synchronous motor, 6, which causes to rotate, by means of the reducer 7 (of which in the drawing only the case is visible) a pin 14, rotating within a suitable housing in the wall 13. The timer disc 8 is solidly fixed to the pin 14. Preferably, the reduction will be such that the disc 8 will carry out one rotation of 360° in 24 hours. In this embodiment, the disc 8 is formed with a jutting edge 15 on which are applied one or more cam-bearing clamps, such as 16 in the drawing, fixing them in the desired position, for example by means of a screw 17.

In one or more of the applied clamps a cam 9 is inserted by pressure, the cam 9 may be chosen among cams of different sizes.

The position on the periphery of the timer disc of a cam to be inserted depends on the hour at which it is desired to carry out the irrigation; to facilitate the positioning, the disc 8 will bear markings of the hour and the part of the cover 18, which covers it will be transparent and easily removable. The duration of the irrigation is determined by the dimension of the cam applied. On the wall 13, furthermore, there is fixed, pivoted in 19, a lever 20, which on one end bears the mercury switch 5, and on the opposite part to the said end with respect to the pivot 19, is returned against a retainer 22, by a spring 23, anchored to the wall 13. Preferably, the spring 23 is not directly connected to the lever 20, but to a lever element 24, pivoted in 25, on the end of lever 20, opposite to that of the switch 5. On the box body 12, furthermore, is fixed the electro-valve 3, controlled by the switch 5, and from the body 12 jut the pipe unions 26 and 27 for connection to the water conduits 1 and 4. The box is closed by a front cover 28 and by a back cover 29, and bears means for fixing for example to a wall and eventually means to correct the slope (necessary if there is a mercury switch). Preferably the main switch 10 with the warning light 11 will be placed on the said front cover.

When the general switch 10 is closed, the motor causes the disc 8 to rotate with a constant speed, for example in the direction of the arrrow in FIG. 2. When a cam 9, touches the upper arm of the element 24, the lever 20 rotates around its pivot 19 and the circuit is closed through the switch 5, the electro-valve 3 is then brought into action, which permits the passage of the water from the conduit 1 to the conduit 4. This situation is maintained during the whole period in which the cam 9 is in contact with the element 24. When, following the disc in its rotation, the cam leaves the element 24, the spring 23 calls the lever 24 back into the rest position; the switch 5 interrupts the circuit and the water flow ceases.

An eventual manual rotation of the disc 8 in the direction opposite to the arrow, for example for regulation, is permitted by the element 24, which at the passage from the cam inclines without involving in its movement the other parts of the mechanism, and then takes up its normal position again.

A possible variant for the timer disc and the cam bearing element is shown in FIGS. 5, 6 and 7. In this embodiment the disc 8' is substantially flat, and one or more cam bearing elements 30, can be applied to it, for example as in the figure, which are fixed to the disc in the positions corresponding to the time chosen for the watering. The element 30 in the drawing is fixed in the pivoting point 14 of the disc, and for example in the points 31 by means of screws; preferably it has a small window 32 which allows the specific time indication among those on the timer disc to be seen. On the cam bearing element 30 is pivoted, so as to be able to assume four rotating positions, a cam-roller or cam-wheels, that is, a roller 33 having on its circumference a smooth portion and 3 jutting cams of different circumferences able to jut out beyond the edge of the element 30.

Obviously, rollers with more or less than four positions and more or less than three cams can be provided.

The time of watering is fixed by placing the element 30 in the desired position, the duration of the watering is fixed by rotating the wheel 33 so that the cam of the desired length presents itself.

The working of the apparatus having the disc 8' is equal to the working of the apparatus having the disc 8.

The conduit 4 exiting from the timer device may lead to any known irrigating or watering device. The apparatus of the present application however, also comprises an improved device for distributing the water over an area to be watered. Said device is represented in FIG. 8 and can be used both for flower pots as well as for flowerbeds or separate plants, or the said devices can be distributed over a wider area.

The device essentially comprises a spraying element 35 and a plate element 36. The spraying element 35 has a connecting means 37, to a water pipe, a nozzle 38 and a stem 39 which is fixed into the ground. The plate element 36 has a plate part 40 and a stem 42 which is fixed into the ground. The two elements are placed facing as in the drawing. The pressure normally existing in the water tube is sufficient to generate a jet of water from the nozzle 38, the water striking against the plate 40, spraying out and spreading over the surrounding ground. If desired, an upper cap 41 around the upper part of the plate stops the water from dispersing upwards.

The device can also be constructed with the spray and the plate facing each other on a single stem.

Other variations are possible in the apparatus subject of the application, for example, as has been said, the mercury switch may be substituted by a spring switch, press switch, etc., without departing from the field of protection of this application.

We claim:

1. Apparatus for automatically irrigating or watering plants and the like on a timetable and for a predetermined period comprising, in combination, an electro-valve for opening and closing a conduit for the distribution of water, a switch for controlling said electro-valve, a rotating timer disc having a peripheral edge portion, at least one cam-supporting clamping element arranged to be detachably mounted on said timer disc peripheral edge portion at a selected location on the circumference of said disc in accordance with the desired timetable, a cam arranged to be mounted on said clamping element for operating said switch, said cam having an extension of a selected size in accordance with the desired length of the period of irrigation.

2. Apparatus in accordance with claim 1, wherein said switch is of the mercury bulb type, and including pivotally mounted lever means for supporting said mercury bulb switch, said lever means being movable into one position for opening said switch and into another position for closing said switch, means for urging said lever means into said one position, said lever means being engageable by said cam extension during the rotation of said disc in one direction for moving said lever means into said other position.

3. Apparatus according to claim 2 wherein said lever means include release means for maintaining said lever means in said one position with said switch in the open position during the rotation of said disc in the opposite direction.

4. Apparatus in accordance with claim 1, wherein said timing disc is provided with graduations to provide a visual indication of the hours.

5. Apparatus according to claim 1, including means for distributing the irrigating water over the surface to be watered, said means comprising a nozzle spraying element connected to the conduit for distribution of the water and a plate element disposed adjacent said nozzle in a selected spaced relationship therewith and ground insertion means for supporting said water distribution means.

6. Apparatus according to claim 5, including a spray-protecting cap on the upper portion of said plate element.

7. Apparatus for automatically irrigating or watering plants or the like on a timetable and for a predetermined period comprising in combination, an electro-valve for opening and closing a conduit for the distribution of water, a switch for controlling said electro-valve, a rotating timer disc, a cam-supporting clamping element arranged to be detachably mounted on said timer disc at a selected location on the circumference of said disc in accordance with the desired timetable, a cam comprising a roller rotatably mounted on said clamping element, said roller having a plurality of circumferentially spaced extensions of various sizes on its outer periphery, and being rotatable into a selected one of a plurality of angular positions for presenting a selected extension to said switch in accordance with the desired length of the period of irrigation.

8. Apparatus according to claim 7, wherein said roller includes a smooth peripheral portion free of said extensions, said roller being rotatable into another angular position to present said smooth peripheral portion for avoiding said switch, thereby omitting the irrigation at the hour established by said clamping element.

9. Apparatus in accordance with claim 7, wherein said switch is of the mercury bulb type, and including pivotally mounted lever means for supporting said mercury bulb switch, said lever means being movable into one position for opening said switch and into another position for closing said switch, means for urging said lever means into said one position, said lever means being engageable by said cam extension during the rotation of said disc in one direction for moving said lever means into said other position.

10. Apparatus according to claim 9, wherein said lever means include release means for maintaining said lever means in said one position with said switch in the open position during the rotation of said disc in the opposite direction.

11. Apparatus according to claim 7, wherein said timing disc is provided with graduations to provide a visual indication of the hours and wherein said clamping element is mounted for adjustable pivotal movement about the central axis of said disc and including circumferentially spaced means adjacent the outer periphery of said disc for fixing said element to said disc in an adjusted angular position and wherein said element is provided with a window for exposing said graduations on said disc corresponding to selected positions of said element on said disc.

12. Apparatus according to claim 7, including means for distributing the irrigating water over the surface to be watered, said means comprising a nozzle spraying element connected to the conduit for distribution of the water and a plate element disposed adjacent said nozzle in a selected spaced relationship therewith and ground insertion means for supporting said water distribution means.

13. Apparatus according to claim 12, including a spray-protecting cap on the upper portion of the plate element.

* * * * *